(12) United States Patent
Park

(10) Patent No.: US 8,219,793 B2
(45) Date of Patent: Jul. 10, 2012

(54) STORAGE MEDIUM TO MANAGE A MASTER BOOT RECORD AND A METHOD OF BOOTING A COMPUTER SYSTEM USING A STORAGE MEDIUM

(75) Inventor: Seong-kook Park, Hwaseongi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 938 days.

(21) Appl. No.: 11/590,817

(22) Filed: Nov. 1, 2006

(65) Prior Publication Data

US 2007/0157013 A1 Jul. 5, 2007

(30) Foreign Application Priority Data

Jan. 4, 2006 (KR) ........................ 10-2006-0001019

(51) Int. Cl.
*G06F 9/00* (2006.01)
*G06F 15/177* (2006.01)

(52) U.S. Cl. ........... 713/2; 713/1; 714/1; 714/2; 714/36; 714/54

(58) Field of Classification Search .................. 713/1, 2; 714/1, 2, 36, 54
See application file for complete search history.

(56) References Cited

U.S. PATENT DOCUMENTS

| | | | |
|---|---|---|---|
| 6,317,845 B1* | 11/2001 | Meyer et al. | 714/23 |
| 6,560,701 B1* | 5/2003 | Berstis et al. | 713/2 |
| 6,792,556 B1* | 9/2004 | Dennis | 714/6.11 |
| 6,963,951 B2* | 11/2005 | Ng et al. | 711/112 |
| 7,111,202 B2* | 9/2006 | Cagle et al. | 714/36 |
| 7,146,525 B2* | 12/2006 | Han et al. | 714/6.11 |
| 7,194,659 B2* | 3/2007 | Buchanan et al. | 714/36 |
| 7,219,257 B1* | 5/2007 | Mahmoud et al. | 714/6.12 |
| 7,263,589 B2* | 8/2007 | Han et al. | 711/163 |
| 7,523,350 B2* | 4/2009 | Lintz et al. | 714/36 |
| 2002/0059498 A1* | 5/2002 | Ng et al. | 711/112 |
| 2002/0152333 A1* | 10/2002 | Nam | 710/1 |

(Continued)

FOREIGN PATENT DOCUMENTS

JP 6-44158 2/1994

(Continued)

OTHER PUBLICATIONS

Office Action issued in Korean Patent Application No. 2006-1019 on Dec. 15, 2006.

(Continued)

*Primary Examiner* — Thomas Lee
*Assistant Examiner* — Jaweed A Abbaszadeh
(74) *Attorney, Agent, or Firm* — Jefferson IP Law, LLP

(57) ABSTRACT

A storage medium to manage a master boot record and a method of booting a computer system using the storage medium. The storage medium includes a master boot record sector area having a master boot record related to a booting operation being currently performed stored therein, a data storage area having a master boot record that is previously changed stored therein, and a firmware to communicate with a host device and to manage the master boot record sector area and the data storage area, wherein, when an error occurs in the master boot record stored in the master boot record sector area, the firmware selects a specific master boot record from the data storage area and stores the selected master boot record in the master boot record sector area.

20 Claims, 5 Drawing Sheets

U.S. PATENT DOCUMENTS

| | | | |
|---|---|---|---|
| 2003/0014619 A1* | 1/2003 | Cheston et al. | 713/1 |
| 2003/0056098 A1 | 3/2003 | Aihara | |
| 2004/0044886 A1* | 3/2004 | Ng et al. | 713/1 |
| 2004/0078679 A1* | 4/2004 | Cagle et al. | 714/36 |
| 2004/0153840 A1* | 8/2004 | Buchanan et al. | 714/42 |
| 2004/0255106 A1* | 12/2004 | Rothman et al. | 713/1 |
| 2005/0015652 A1* | 1/2005 | Han et al. | 714/6 |
| 2006/0041738 A1* | 2/2006 | Lai | 713/2 |
| 2007/0011493 A1* | 1/2007 | Du et al. | 714/36 |
| 2008/0077784 A1* | 3/2008 | Robinson et al. | 713/1 |

FOREIGN PATENT DOCUMENTS

| | | |
|---|---|---|
| JP | 10-240541 | 9/1998 |
| JP | 2002-55764 | 2/2002 |
| JP | 2003-92784 | 3/2003 |
| KR | 20-253716 | 10/2001 |
| KR | 2005-15972 | 2/2005 |
| KR | 2005-21736 | 3/2005 |
| KR | 2005-32902 | 4/2005 |

OTHER PUBLICATIONS

Dong, Weifang, "A Method of Recovering a Computer Hard Disk Boot Program", *Laboratory Research and Exploration*, No. 2, 1997, pp. 68-69.

First Office Action issued May 9, 2008 by the State Intellectual Property Office of the People's Republic of China re: Chinese Application No. 200610164283.9 (11 pp).

Office Action issued in Korean Patent Application No. 2006-1019 on Jun. 27, 2007.

* cited by examiner

STORAGE MEDIUM TO MANAGE A MASTER BOOT RECORD AND A METHOD OF BOOTING A COMPUTER SYSTEM USING A STORAGE MEDIUM

CROSS-REFERENCE TO RELATED APPLICATION

This application claims the benefit of Korean Application No. 2006-1019, filed Jan. 4, 2006 in the Korean Intellectual Property Office, the disclosure of which is incorporated herein by reference.

BACKGROUND OF THE INVENTION

1. Field of the Invention

An aspect of the present invention relates to a method of booting a computer system using a master boot record, and, more particularly, to a storage medium that is capable of performing a booting process by storing master boot record data being changed and by recovering a master boot record at a desired time.

2. Description of the Related Art

In general, a hard disk drive (HDD) of a computer system is characterized by storage addresses that range from a zero address to a maximum address, and includes one or more cylinders and a master boot record (MBR). In this case, the master boot record is allocated to one sector that forms the hard disk drive and notifies the computer system how to boot from the hard disk and in which sectors all the files are allocated to. In addition, the master boot record includes a file allocation table (FAT) having information on the positions of all files and data and the position of the hard disk drive.

Meanwhile, the computer system performs booting using the master boot record. FIG. 1 shows the configuration of a computer system for performing booting according to the related art. As shown in FIG. 1, the computer system, according to the related art, includes a flash memory 140 having BIOS data related to the basic operation of the computer system stored therein, a central processing unit 110 that reads out the BIOS data from the flash memory 140 and boots the computer system, a controller 120 that is operated by the central processing unit 110 and reads/writes data from/to the flash memory 140, a hard disk drive 190 that stores data and has a boot record to store booting records recorded therein, and a hard disk controller 180 that outputs controls signals to drive the hard disk drive 190 according to instructions from the central processing unit 110.

A booting process of the computer system having the above-mentioned configuration according to the related art will be described below.

When power is supplied to the computer system, the central processing unit 110 outputs an address signal to enable the controller 120. The controller 120 enabled by the central address device 110 activates a ROM selection signal that reads the address signal and data from the flash memory 140. Then, a ROM BIOS in the flash memory 140 performs a POST (power on self test) routine to check hardware of the computer system and the state of the hard disk drive 190. The ROM BIOS reads the master boot record of the hard disk drive 190 through the hard disk controller 10. However, when the ROM BIOS does not read the master boot record of the hard disk drive 190, a message "Drive Failure" or an equivalent thereto is output to a user. The message informs the user of a booting error. When the ROM BIOS of the flash memory 140 reads the master boot record of the hard disk drive 190 without errors, the controller 120 transmits the read BIOS data to the central processing unit 110 through the system bus 150. Then, the computer system is automatically booted in a predetermined booting order.

However, in the booting process of the computer system according to the related art, the master boot record of the hard disk drive 190 may be deleted or damaged due to, for example, viruses, which prevent booting processes from progressing. In this case, the user should use an additional recovery tool to boot the computer system, or the user needs to request an expert in this field to recovery the computer system, resulting in a high recovery cost.

SUMMARY OF THE INVENTION

An aspect of the invention provides a technique for storing master boot record data in a storage space of a hard disk drive and for recovering a master boot record at a desired time so as to, thereby, perform booting processes.

According to an aspect of the invention, a storage medium for managing a master boot record includes a master boot record sector area having a master boot record related to a booting operation being currently performed stored therein; a data storage area having a master boot record that is previously changed stored therein; and a firmware to communicate with a host device and to manage the master boot record sector area and the data storage area, wherein, when an error occurs in the master boot record stored in the master boot record sector area, the firmware selects a specific master boot record from the data storage area and stores the selected master boot record in the master boot record sector area.

According to another aspect of the invention, a method of booting a computer system includes extracting master boot record data from a master boot record sector area of the storage medium in which a master boot record related to a booting operation being currently performed by the host device is stored; when an error occurs in the extracted master boot record data, selecting specific master boot record data from a data storage area of the storage medium in which a master boot record, which is previously changed, is stored; and performing the booting operation by using the selected master boot record data.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
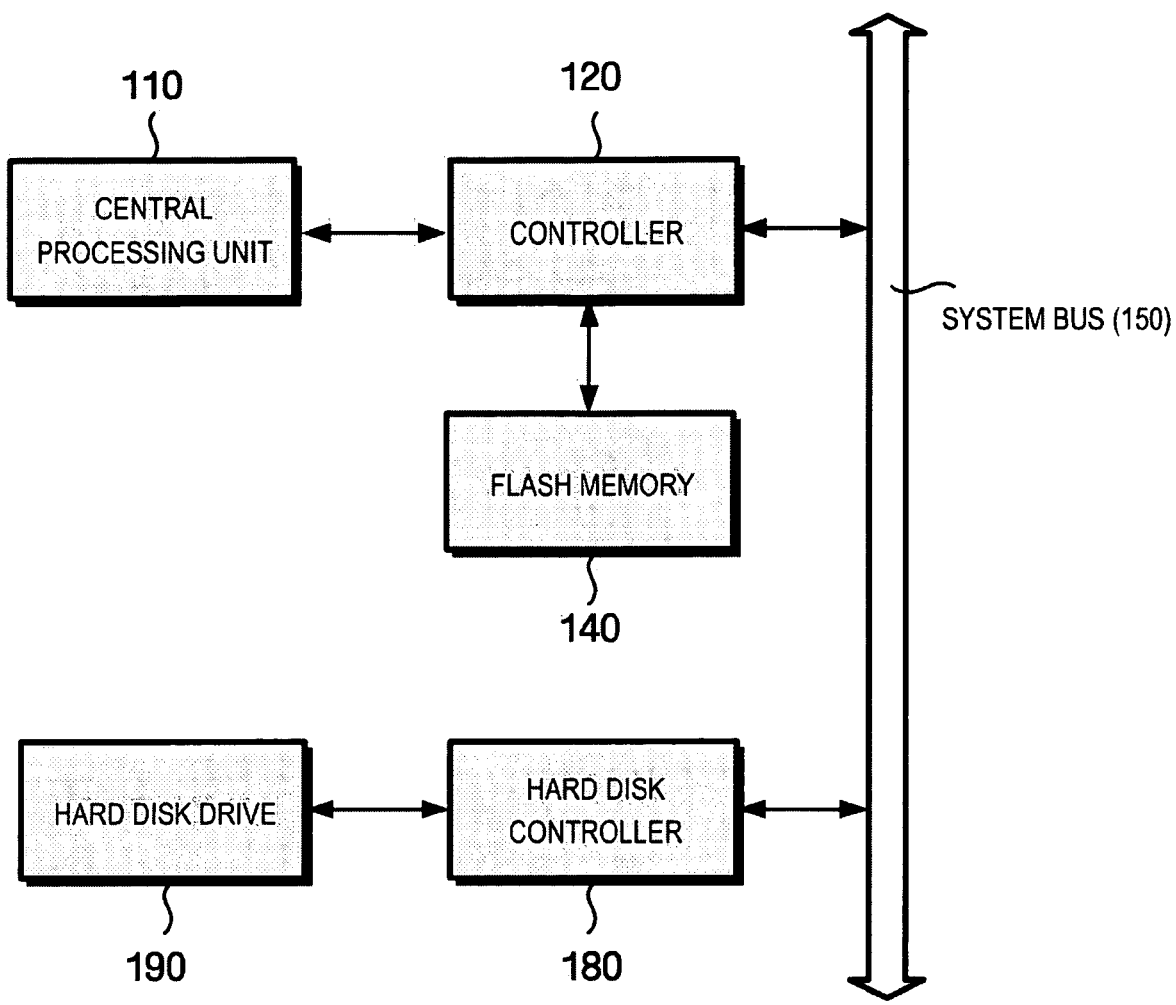
FIG. 1 is a block diagram illustrating the configuration of a computer system according to the related art.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The present invention is described hereinafter with reference to flowcharts and block diagrams for illustrating a storage medium to manage a master boot record and a method of booting a computer system using the storage medium according to embodiments of the invention. It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the flowchart block or blocks. These computer program instructions may also be stored in a computer usable or computer-readable memory that directs a computer or other programmable data processing apparatus to function in a particular manner, such that the instructions stored in the computer usable or computer-readable memory produce an article of manufacture including instructions that cause the function specified in the flowchart block or blocks to be implemented. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 2:
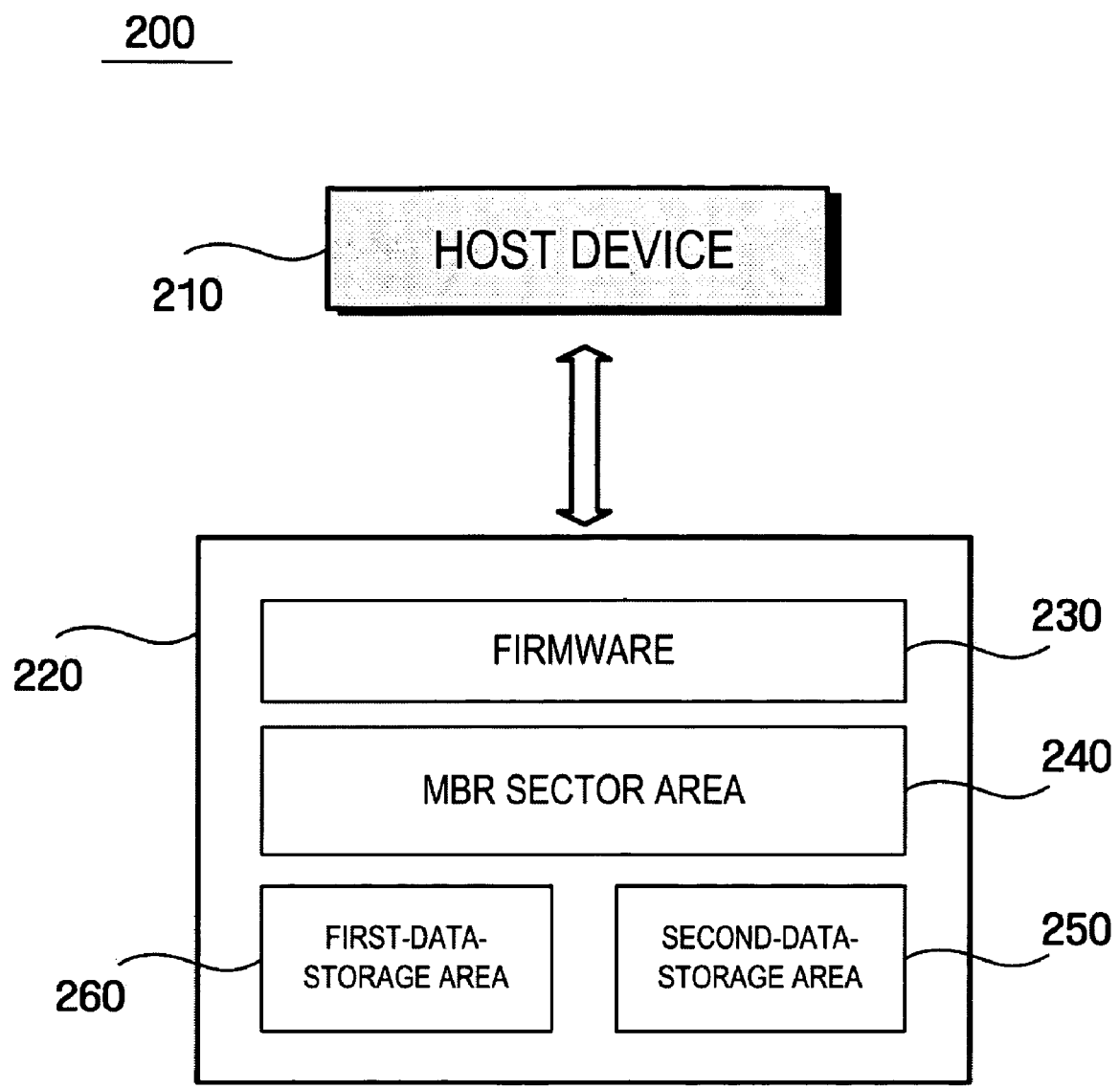
FIG. 2 is a block diagram illustrating a computer system according to an embodiment of the invention.

FIG. 2 is a block diagram illustrating a computer system according to an embodiment of the invention. As shown in FIG. 2, a computer system 200 includes a host device 210 and a storage medium 220. The storage medium 220 includes a firmware 230, a master boot record (MBR) sector area 240, in which a master boot record (hereinafter, referred to as an "MBR") related to a booting operation being currently executed is stored, a first data storage area 260 having general data stored therein, and a second data storage area 250 having MBR data that is previously changed.

The host device 210 includes a central processing unit, a non-volatile memory, such as a flash memory, and a controller to control the storage medium 220. The non-volatile memory has BIOS data that is related to the basic operation of the computer system 200 stored therein. Here, any device may be regarded as the host device 210 according to the invention as long as the device is able to process digital information using data stored in the storage medium 220.

The firmware 230 communicates with the host device 210 to manage each area of the storage medium 220. The term "management" refers to extracting data from the first data storage area 260 or to storing data in the first data storage area 260 at the request of the host device 210. In addition, the term "management" also refers to an operation of extracting MBR data from the MBR sector area 240 or the second data storage area 250 when the computer system 200 is booted and to providing the extracted data to the host device 210.

If a user operates the host device 210 of the computer system 200, the central processing unit of the host device 210 controls a ROM BIOS of the non-volatile memory to execute a POST (power on self test) routine to check the hardware of the computer system 200 and to check the state of the storage medium 220. At that time, the host device 210 communicates with the firmware 230.

The ROM BIOS reads out the master boot record stored in the MBR sector area 240 of the storage medium 220 through a controller to control the storage medium 220. At that time, if the MBR data stored in the MBR sector area 240 has viruses therein, a booting error may occur.

Therefore, in this case, an instruction from the host device 210 or the control of the firmware 230 causes the MBR data that is previously stored in the second data storage area 252 to be extracted, and the extracted data is supplied to the host device 210, which makes continuously performing the booting operation of the computer system 200 possible.

Here, according to an embodiment of the invention, only the firmware 230 is able to access the second data storage area 250, and information on the number of MBRs that are previously changed and stored in the second data storage area 250 may be stored in the storage medium 220. In addition, MBRs stored in the second data storage area 250 may form a data configuration in which they establish a linked relationship in a time sequence.

When MBRs that are stored in the MBR sector area 240 have viruses, the host device 210 notifies a user that a booting error has occurred through a screen of a display (not shown). In this case, the host device 210 displays a list of the previous MBRs stored in the second data storage area 250 of the storage medium 220 on the screen so that the user may select the latest or a specific MBR. When the user selects a specific MBR, the selected MBR is stored in the MBR sector area 240, and the host device 210 accesses the MBR sector area 240, thereby booting the computer system 200.

Figure 3:
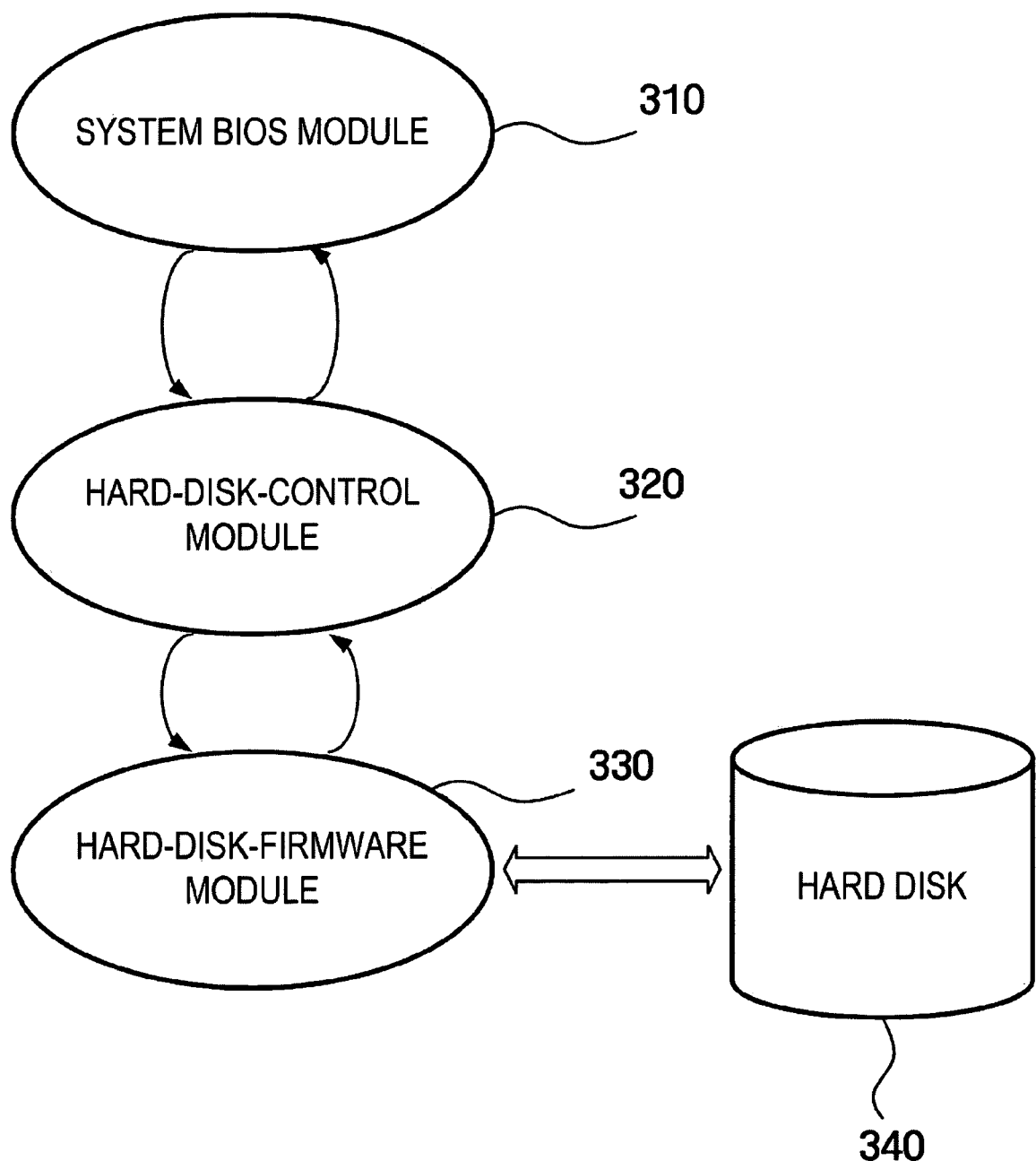
FIG. 3 is a diagram illustrating the configuration of a module for managing a master boot record according to an embodiment of the invention.

FIG. 3 is a diagram illustrating an example of the configuration of a module to manage a master boot record according to an embodiment of the invention; As shown in FIG. 3, a module to manage MBRs, according to aspects of the invention, includes a BIOS module 310, a hard disk control module 320, and a hard disk firmware module 330.

The term "module," as used herein, refers to, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables, or combinations thereof. The functionality provided for in the components and modules may be combined into fewer components and modules or further separated into additional components and modules. In addition, the components and modules may be implemented such that they execute one or more CPUs in a device or a security multimedia card.

The BIOS module 310 may be provided in a non-volatile memory of the host device 210, and operates, in at least one manner, by requesting that the hard disk control module 320 read out MBRs that are stored in a hard disk 340. Also, the BIOS module 310 requests that the hard disk control module 320 read information on the number of MBRs that are stored in the hard disk 340.

The hard disk control module 320 outputs control signals to drive the hard disk 340 according to instructions from the central processing unit of the host device 210, and controls the hard disk firmware module 330 to read out MBR stored in the hard disk 340 at the request of the BIOS module 310. The hard disk firmware module 330 manages the operation of parts of the hard disk 340, and corresponds to the firmware 230 shown in FIG. 2. The hard disk 340 stores data and includes the MBR sector area 240, the first data storage area 260, and the second data storage area 250 shown in FIG. 2.

In accordance with aspects of the invention, as shown in FIG. 3, the BIOS module 310 and the hard disk control module 320 may be provided in the host device 210. Meanwhile, the hard disk firmware module 330 and the hard disk 340 may form the storage medium 220 shown in FIG. 2.

If an MBR, which is stored in the MBR sector area 240 of the hard disk 340, has viruses therein, the BIOS module 310 may be arbitrarily selected by the user. Alternately, the hard disk firmware module 330 extracts the MBR stored at a specific time from the second data storage area 250 by a predetermined method and restores the extracted MBR in the MBR sector area 240.

Whenever the content of MBR stored in the MBR sector area 240 is changed, the hard disk firmware module 330 may sequentially store the changed MBRs in the second data storage area 250, and the hard disk firmware module 330 may provide information on the number of MBRs stored in the second data storage area 250 to the host device 210 at the request of the host device 210.

Figure 4:
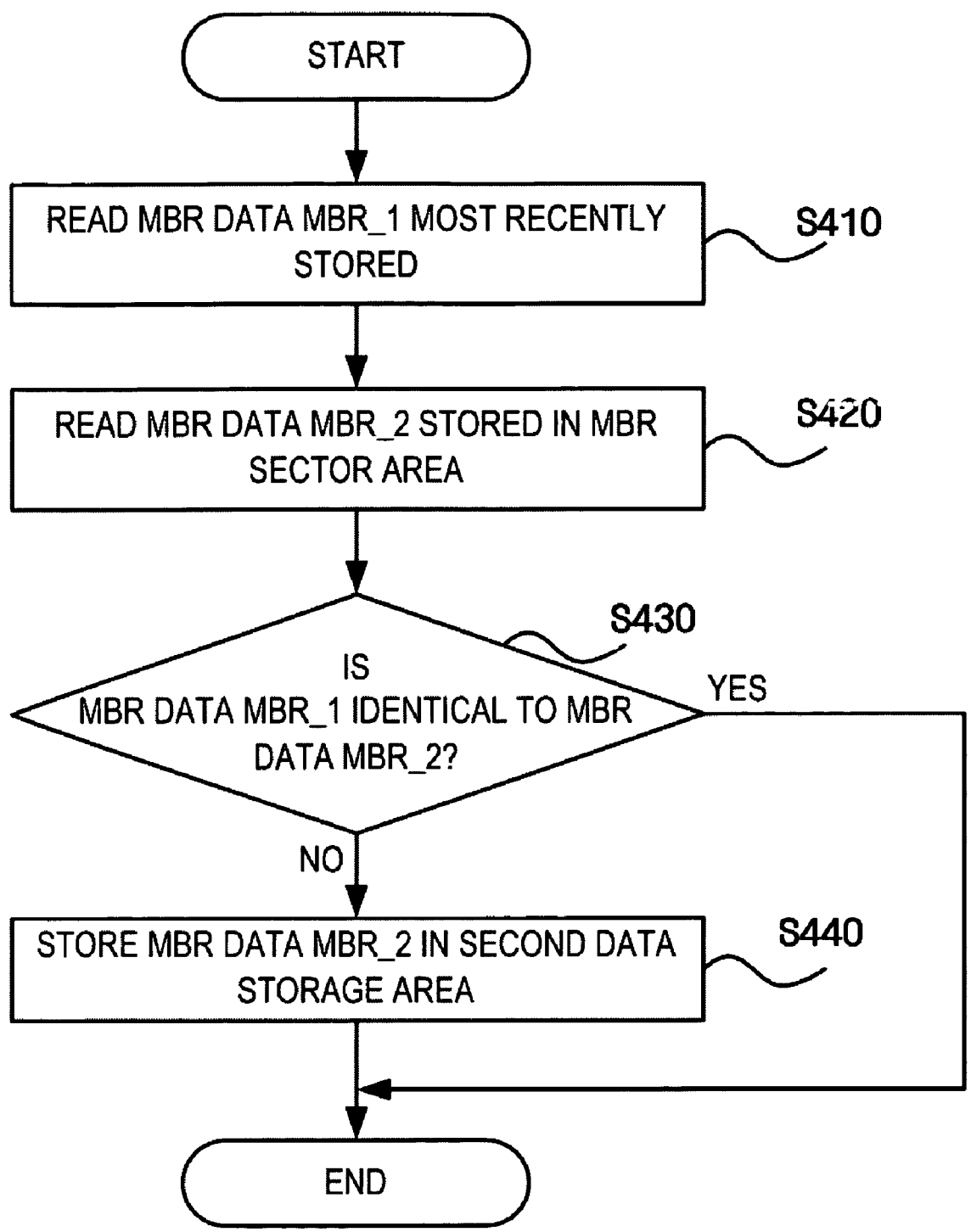
FIG. 4 is a flowchart illustrating a process of storing a master boot record according to an embodiment of the invention.

FIG. 4 is a flowchart illustrating a process of storing a master boot record according to an embodiment of the invention. First, whenever the computer system 200 is initialized or reset, the hard disk firmware module 320 reads out the MBR data MBR_1 that is most recently stored from the second data storage area 250 (S410). Then, the hard disk firmware module 320 reads out MBR data MBR_2 from the MBR sector area 240 (S420). The hard disk firmware module 330 compares the MBR data MBR_1 with the MBR data MBR_2 (S430). When MBR data MBR_1 and MBR data MBR_2 are determined to be identical to each other, the MBR data in the MBR sector area 240 is not stored in the second data storage area 250.

However, when, in operation S430, MBR data MBR_1 and MBR data MBR_2 are determined to not be identical to each other, the MBR data MBR_2 in the MBR sector area 240 is stored in the second data storage area 250. At that time, information indicating the number of MBRs stored in the second data storage area 250 increases by one, and the information indicating the number of MBRs stored in the second data storage area 250 may also be included in the second data storage area 250.

The MBR data MBR_2 that is newly stored in the second data storage area 250 may be stored while forming links with other MBRs previously stored in time sequence. Meanwhile, the process shown in FIG. 4 may be performed even when the computer system 200 operates in real time.

Figure 5:
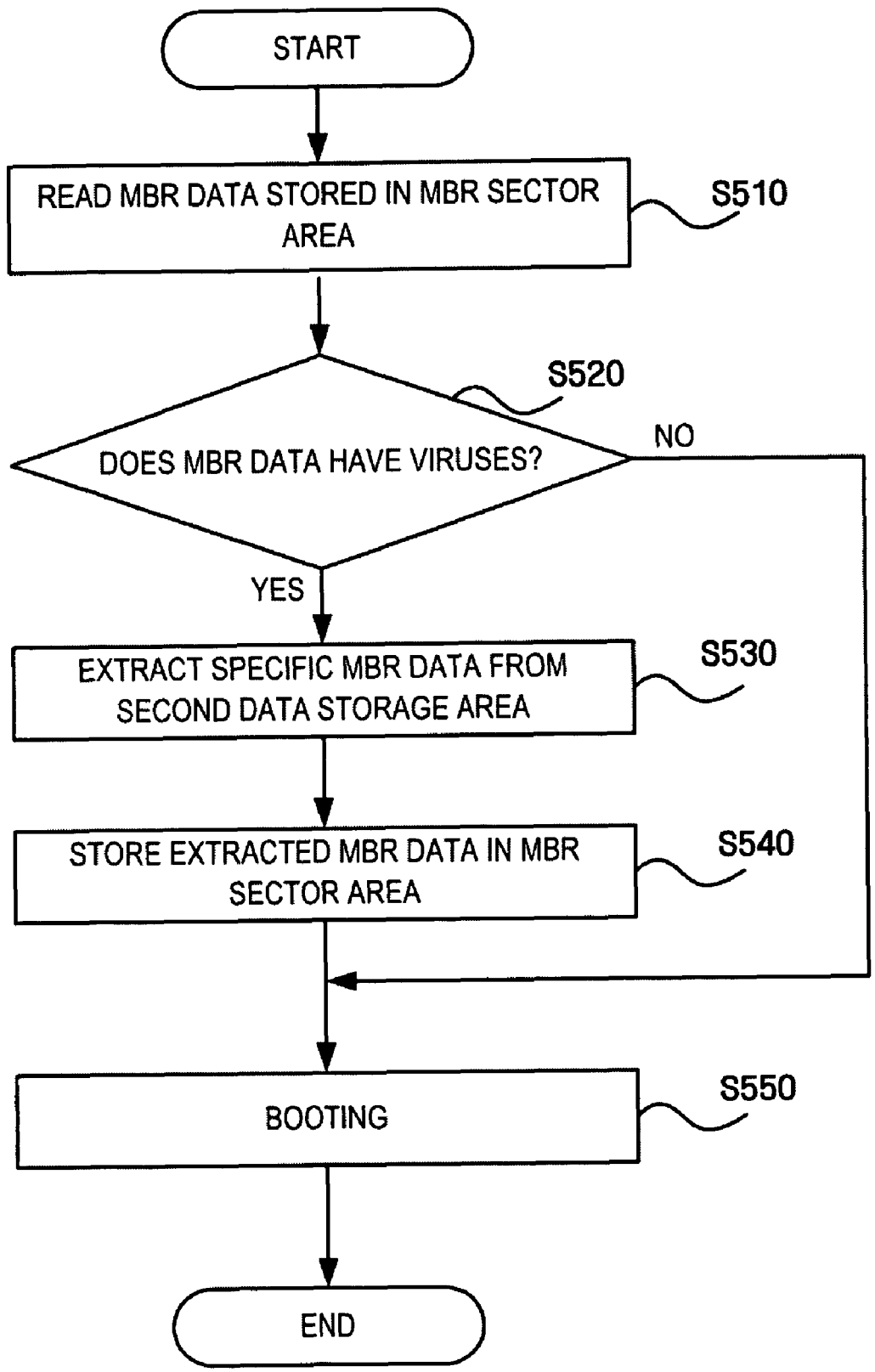
FIG. 5 is a flowchart illustrating a process of booting a computer system according to an embodiment of the invention.

FIG. 5 is a flowchart illustrating a booting process of a computer system according to an embodiment of the invention. As shown in FIG. 5, first, the hard disk firmware module 330 reads out the MBR data from the MBR sector area 240 and supplies the read data to the host device 210 (S510). At that time, the host device 210 determines whether the MBR data supplied from the hard disk firmware module 330 has viruses therein (S520). When the MBR data is determined to not contain viruses, booting is performed (S550).

On the other hand, when the MBR data is determined to have viruses, the host device 210 requests the hard disk firmware module 330 to extract specific MBR data from the second data storage area 250 (S530). MBR data extracted at that time may be MBR data most recently stored or MBR data selected by the user at a specific time.

The hard disk firmware module 330 stores the MBR data extracted from operation S530 in the MBR sector area 240, and supplies the stored MBR data to the host device 210, thereby booting the computer system (S550).

According to aspects of the invention, even when a master boot record has viruses therein, booting a computer system using master boot record data that is previously stored is possible.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A storage medium for use with a computer system to manage a master boot record of the computer system, the storage medium comprising:
    a master boot record sector area having a master boot record related to a booting operation being currently performed stored therein;
    a data storage area having a plurality of master boot records that are previously changed stored therein; and
    a firmware to communicate with a host device and to manage the master boot record sector area and the data storage area, wherein, when the computer system determines that an error occurs in the master boot record stored in the master boot record sector area, the firmware selects a specific master boot record from the plurality of master boot records by a predetermined method and stores the selected master boot record in the master boot record sector area.

2. The storage medium of claim 1, wherein the master boot record selected from the data storage area is a most recently stored master boot record.

3. The storage medium of claim 1, wherein the selected master boot record is a stored master boot record that was stored at a specific time.

4. The storage medium of claim 1, wherein the firmware compares the master boot record stored in the master boot record sector area at a specific time with the master boot record stored in the data storage area.

5. The storage medium according to claim 4, wherein, when the master boot record stored in the master boot record sector area at the specific time is found to be different from the master boot record stored in the data storage area, the firmware stores the master boot record stored in the master boot record sector area in the data storage area.

6. The storage medium of claim 5, wherein the specific time comprises a time when initialization is performed by the host device.

7. The storage medium of claim 5, wherein the specific time comprises a time when a reset operation is performed by the host device.

8. The storage medium of claim 5, wherein the specific time comprises a time when a real-time operation is performed by the host device.

9. The storage medium of claim 5, wherein the firmware stores the master boot record stored in the master boot record sector area in the data storage area by forming links with other master boot records previously stored in the data storage area in a timed sequence.

10. A method of booting a host device, including a storage medium, the method comprising:
   extracting master boot record data from a master boot record sector area of the storage medium in which a plurality of master boot records related to a booting operation being currently performed by the host device is stored;
   when the host device determines that an error occurs in the extracted master boot record data, selecting specific master boot record data from the plurality of master boot records stored in the storage medium by a predetermined method in which a master boot record, which is previously changed, is stored; and
   performing the booting operation by using the selected master boot record data.

11. The method of claim 10, wherein the master boot record data selected in the selecting of the specific master boot record data is a most recently stored master boot record.

12. The method of claim 10, wherein the selected master boot record data is stored master boot record data that was stored at a specific time.

13. The method of claim 10, further comprising comparing the master boot record data stored in the master boot record sector area at a specific time with the master boot record data stored in the data storage area.

14. The method according to claim 13, further comprising storing the master boot record data stored in the master boot record sector area in the data storage area when the master boot record data stored in the master boot record sector area at the specific time is found to be different from the master boot record data stored in the data storage area.

15. The method of claim 14, wherein the specific time comprises a time when initialization is performed by the host device.

16. The method of claim 14, wherein the specific time comprises a time when a reset operation is performed by the host device.

17. The method of claim 14, wherein the specific time comprises a time when a real-time operation is performed by the host device.

18. The method of claim 12, wherein the storing of the master boot record data stored in the master boot record sector area in the data storage area comprises forming links with other master boot record data previously stored in the data storage area in a timed sequence.

19. A module of a host device to manage a master boot record of a hard disk of the host device, the hard disk including master boot record (MBR) sector area and a data storage area, the module comprising:
   a basic input/output system (BIOS) module provided in the host device to request read outs of a plurality of master boot records (MBRs) of the hard disk and a number of the MBRs stored in the MBR sector area;
   a hard disk control module to respond to the BIOS module by reading out the stored MBRs from the hard disk, wherein, if the host device determines that an MBR, which is stored in the MBR sector area, has errors therein, a hard disk firmware module of the hard disk extracts an MBR by a predetermined method from the plurality of MBRs and restores the extracted MBR in the MBR sector area.

20. A method of booting a host device, including a hard disk, the method comprising:
   extracting master boot record data from a master boot record sector area of the hard disk in which a plurality of master boot records related to a booting operation being currently performed by the host device are stored;
   when the host device determines that the extracted master boot record data contains an error, selecting specific master boot record data from the plurality of master boot records by a predetermined method in which a master boot record, which is previously changed, is stored; and
   performing the booting operation by using the selected master boot record data.

* * * * *